United States Patent
Aiyer et al.

(10) Patent No.: US 9,183,487 B2
(45) Date of Patent: Nov. 10, 2015

(54) MULTI CHIP SMART CARD

(71) Applicant: International Business Machines Corporation, Armonk, NY (US)

(72) Inventors: Chandrasekara Aiyer, Newington (AU); Andrew J. Bernoth, Lara (AU); Harish Rajagopal, Holsworthy (AU)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 13/767,342

(22) Filed: Feb. 14, 2013

(65) Prior Publication Data

US 2014/0224883 A1 Aug. 14, 2014

(51) Int. Cl.
*G06K 19/06* (2006.01)
*G06K 19/077* (2006.01)
*G06K 19/07* (2006.01)

(52) U.S. Cl.
CPC ...... *G06K 19/07745* (2013.01); *G06K 19/0721* (2013.01)

(58) Field of Classification Search
USPC .......................................................... 235/492
See application file for complete search history.

(56) References Cited

U.S. PATENT DOCUMENTS

| | | | |
|---|---|---|---|
| 4,443,027 A | 4/1984 | McNeely et al. | |
| 4,700,055 A | 10/1987 | Kashkashian, Jr. | |
| 5,530,232 A | 6/1996 | Taylor | |
| 5,646,392 A * | 7/1997 | Oguchi | 235/475 |
| 6,623,039 B2 | 9/2003 | Thompson et al. | |
| 6,732,919 B2 | 5/2004 | Macklin et al. | |
| 7,191,952 B2 | 3/2007 | Blossom | |
| 2002/0023963 A1* | 2/2002 | Luu | 235/492 |
| 2003/0010828 A1* | 1/2003 | Hirata et al. | 235/486 |
| 2004/0210498 A1 | 10/2004 | Freund | |
| 2004/0237360 A1 | 12/2004 | Nelms et al. | |
| 2013/0161390 A1* | 6/2013 | Rodriquez | 235/441 |

FOREIGN PATENT DOCUMENTS

WO    WO 98/14916    *    4/1998    ............ G07F 7/08

OTHER PUBLICATIONS

"Multi chip RFid packages to replace multiple RFid cards | RFID Blog," posted Jul. 22, 2012, date printed Nov. 9, 2012 <http://www.rfidblog.org/entry/multi-chip-rfid-packages-to-replace-multiple-rfid-cards/>.

"National Smartcard Framework," Department of Finance and Deregulation, Australian Government Information Management Office, Dec. 2008, © Commonwealth of Australia.

"Smart card," Wikipedia, the free encyclopedia, page last modified on Nov. 26, 2012, date printed Dec. 2, 2012 <http://en.wikipedia.org/wiki/Smart_card>.

* cited by examiner

*Primary Examiner* — Michael G Lee
*Assistant Examiner* — David Tardif
(74) *Attorney, Agent, or Firm* — Nicholas L. Cadmus; David B. Woycechowsky

(57) ABSTRACT

A smart card assembly with at least two chips. In some embodiments, the at least two chips are on the same major surface and define mutually-perpendicular, respective directions of insertion with respect to a standard reciprocating card reader. In some embodiments, the at least two chips are respectively mounted on opposite major surfaces of the smart card body.

11 Claims, 4 Drawing Sheets

MULTI CHIP SMART CARD

FIELD OF THE INVENTION

The present invention relates generally to the field of smart cards, and more particularly to smart cards that have multiple chips mounted thereon.

BACKGROUND OF THE INVENTION

"Smart cards" (that is, a generally credit card size and shape card bearing one or two computer readable chips) are known. As shown in FIG. 1, smart card system 100 includes: reciprocating card reader 102 and card assembly 130. Card reader 102 includes: frame 106; card recess 104; reader electronics sub-assembly 110; reader head sub-assembly 112; first side wall 114; rear wall 116; second side wall 118; and communications line 120. Card assembly 130 includes: card main body 132; and chip 134. Card main body 132 includes: first peripheral edge 132a; read edge 132b; and second peripheral edge 132c.

Card reader 102 is called a "reciprocating" card reader because a card is inserted in an insertion direction, and later removed from the card reader by actuating the card in a direction opposite to the insertion direction.

In order for card reader 102 to read card assembly 130, chip 134 should be in close proximity to head 112. The card main body and card hole of the card reader are sized and shaped so that the card assembly can be reliably seated in the card hole (by moving the card in the direction of arrow E) so that the chip on the card and head on the reader will be in close proximity and alignment when the card is fully seated in the reader. More specifically, edges 132a, 132b, and 132c, respectively engage walls 114, 116, and 118 of the reader. When this engagement exists, the chip will be in close proximity to the head, so that reliable data communication can take place between the chip and the head. In most chip and head designs, the head must actually physically contact the outer major surface of the chip in order for there to be data communication between the chip and the head. Moreover, this physical contact must occur at a fairly precise location with respect to the chip and the head. In addition to the side and rear walls 114, 116, and 118, frame 106 may include top and bottom walls to engage and guide the top and bottom major surfaces of the card. After the reader has read the card, the card is removed by pulling it out of the reader in the counter-E direction (that is, the direction opposite to the E direction).

SUMMARY

According to one aspect of the present invention, a smart card assembly is for use with a reciprocating card reader. The assembly includes: a card body; a first chip; and a second chip. The card body includes a first major surface. The first and second chips are mounted on the first major surface at a location and in an orientation, so that an insertion direction for reading the first chip by the reciprocating card reader is at least substantially perpendicular to an insertion direction for reading the second chip by the reciprocating card reader.

According to a further aspect of the present invention, a smart card assembly is for use with a reciprocating card reader. The assembly includes: a card body, a first chip, a second chip, a third chip, and a fourth chip. The card body includes a first major surface. The first, second, third and fourth chips are mounted on the first major surface at a location and in an orientation so that an insertion direction for reading the first chip by the reciprocating card reader is at least substantially perpendicular to an insertion direction for reading the second chip by the reciprocating card reader. An insertion direction for reading the third chip by the reciprocating card reader is at least substantially perpendicular to an insertion direction for reading the fourth chip by the reciprocating card reader. The insertion direction for reading the first chip by the reciprocating card reader is at least substantially opposite the insertion direction for reading the third chip by the reciprocating card reader.

According to a further aspect of the present invention, a smart card assembly is for use with a reciprocating card reader. The assembly includes: a card body, a first primary-side chip, and a first secondary-side chip. The card body includes a first major surface and a second major surface. The first primary-side chip is mounted on the first major surface of the card body. The first secondary-side chip is mounted on the second major surface of the card body.

DETAILED DESCRIPTION

Figure 2:
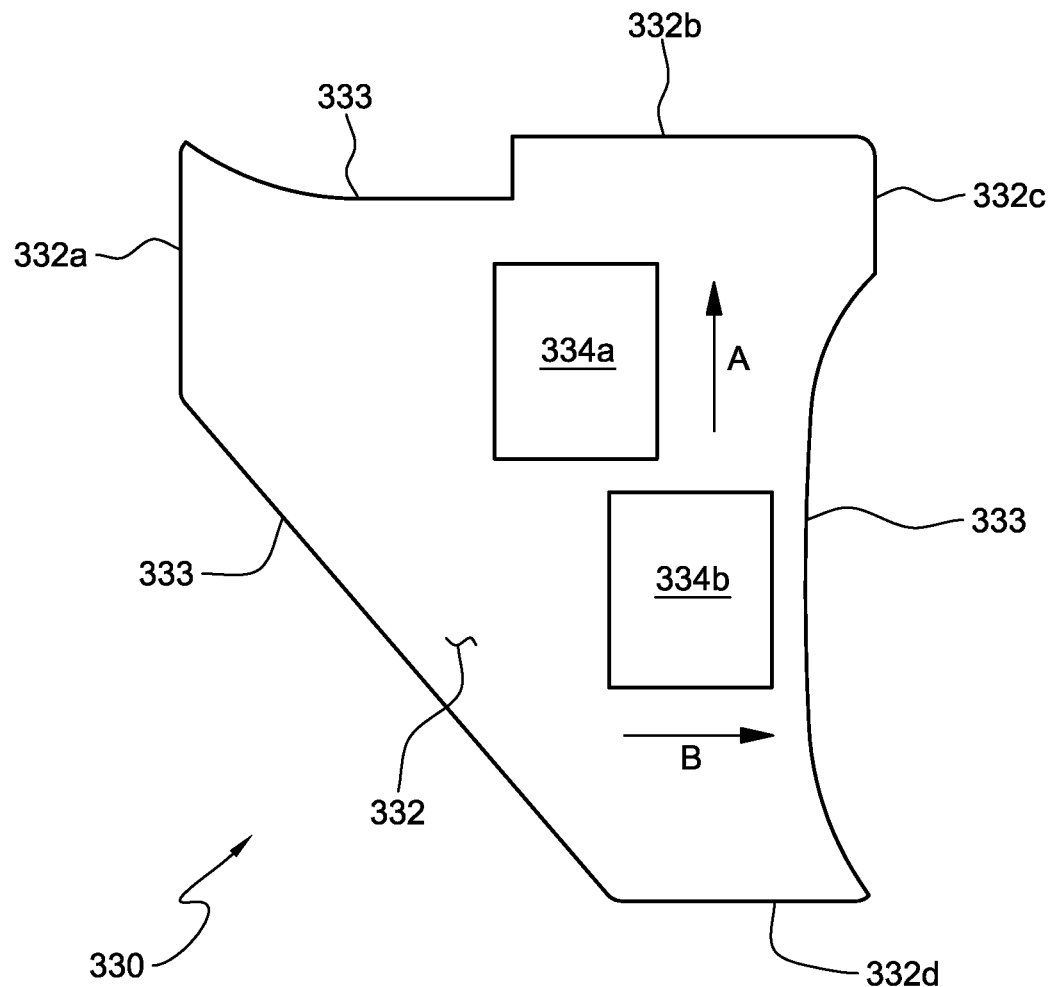
FIG. 2 is an orthographic front view of a first embodiment of a smart card according to the present invention.

As shown in FIG. 2, smart card assembly 330 includes: card body 332; card straight edges 332a, 332b, 332c, and 332d; smart card irregular edges 333; smart card chips 334a, 334b. Smart card 330 defines mutually perpendicular (or normal) directions A and B.

Figure 1:
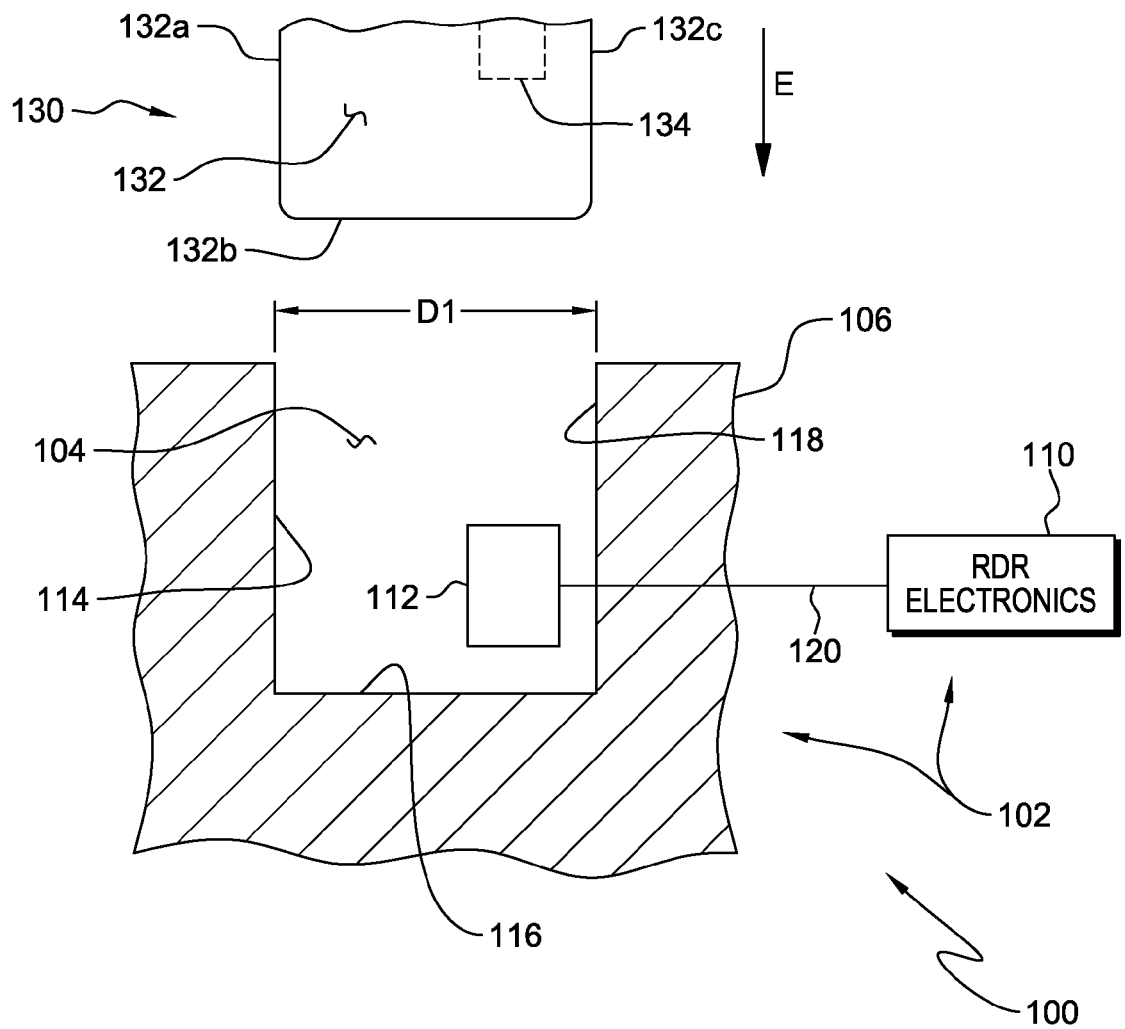
FIG. 1 is a partial cross-section view of prior art smart card system.

Smart card 330 is not necessarily a preferred embodiment, but is included for instructional purposes. The card body slides into a standard card reader either the "A" or "B" direction. More specifically: (i) straight edges 332a, 332c and 332b can be used to reliably guide and seat smart card 330 when it is inserted into a standard reciprocating card reader (see FIG. 1) in direction A for interfacing with chip 334a; and (ii) straight edges 332b, 332c and 332d can be used to reliably guide and seat smart card 330 when it is inserted into a standard reciprocating card reader in direction B for interfacing with chip 334b.

Chips 334a and 334b are precisely located on the smart card so that they will be in proximity to the reader head when the card is respectively inserted in mutually perpendicular directions A and B. In order for a standard reciprocating card reader (see FIG. 1) to read chip 334a, the placement of chip 334a, with respect to certain edges of the card, is important. More specifically, the placement of chip 334a with respect to card edges 332a and 332b will effectively define the exact location of the chip when the card is fully seated in a standard reciprocating card reader (that is, when edge 332b hits the bottom wall of the card reader card-accepting recess). By controlling the location and/or orientation of chip 334a relative to these two edges, it can be assured that the card reader reading head will make appropriate data communication connection (for example, a physically contacting connection, making a data communication connection that does not require physical contact) with the chip when the smart card is fully seated within the card-receiving recess in the card reader. Notice, that when inserting the smart card into a reader in the direction of arrow A, all three of these edges will engage with the card reader recess walls in order to guide and reliably seat the card. Similar reasoning applies with respect to chip 334b and the two edges 332b, 332c and 332d.

As shown in FIG. 2, smart card assembly 330 includes irregular edges. These irregular edges are not necessarily preferred, but are included in embodiment 330 to demonstrate that the footprint of the smart card may take on many different shapes so long as the required edges for card operation are present as part of this footprint.

In assembly 330, smart chips 334a and 334b respectively store different information. For example, in this embodiment chip 334a stores the card owner's governmental identification, while chip 334b stores private bank account information. In various embodiments of the present invention, the data stored on the chips could be any type of data stored on smart card chips now or in the future. By changing the orientation of the card body in the card reader, between the mutually perpendicular A and B directions, the owner of the card effectively selects the appropriate application. Alternatively, the information on all chips could be identical for the sake of redundancy.

ISO (International Standards Organization) CR-80 and/or 7810 are the specifications currently common for smart cards to be used with standard reciprocating card readers. Generally speaking a designer would place the chips according to applicable "specs" for the card reader that he wanted the smart card to be used with. In some embodiments, different specifications may be used respectively for multiple chips, which may be useful if there are ever more than one set of competing specifications for card readers in use at the same time.

Figure 3:
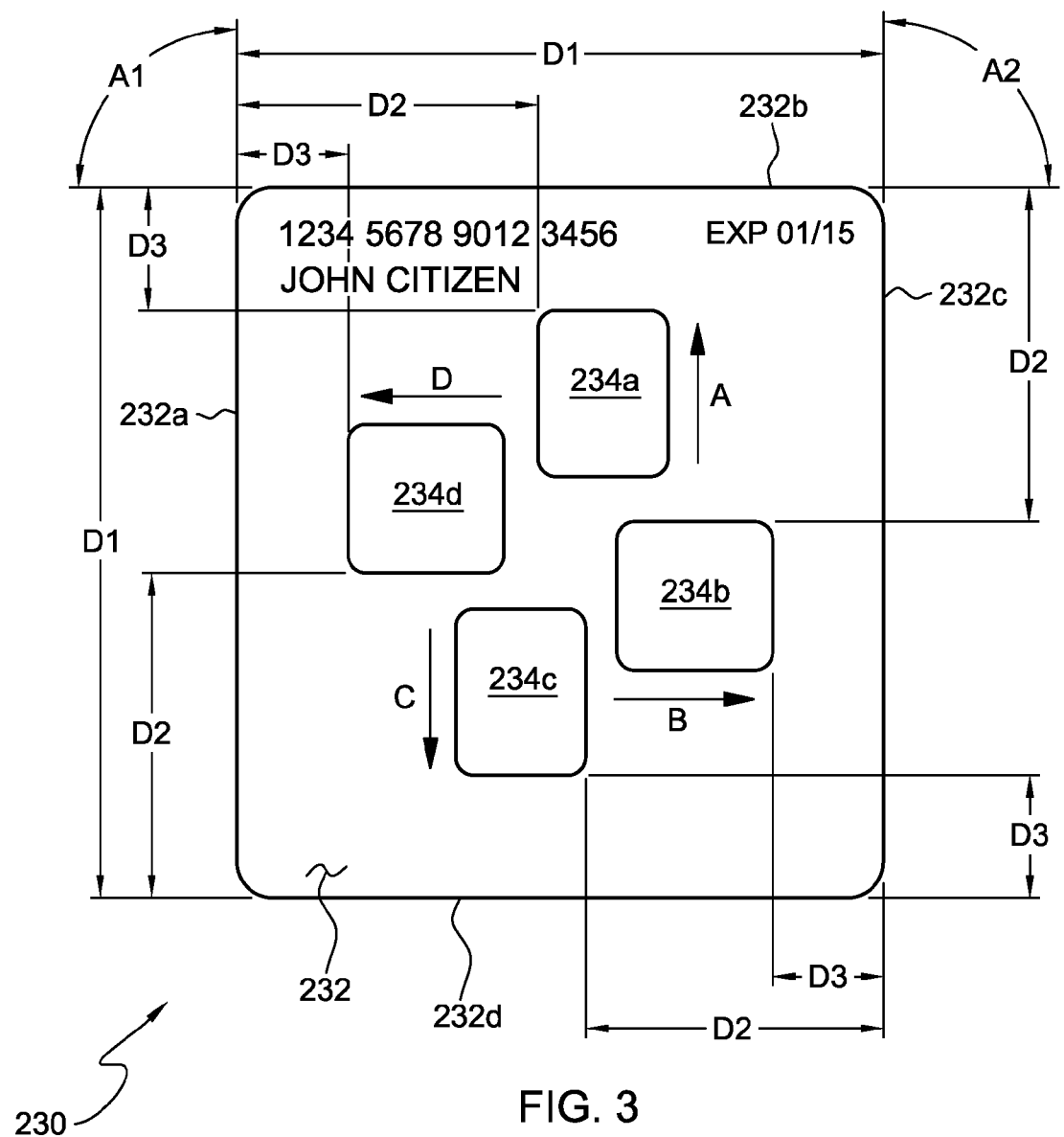
FIG. 3 is an orthographic front view of a second embodiment of a smart card according to the present invention.

As shown in FIG. 3, smart card 230 includes: card body 232; card edges 232a, 232b, 232c, and 232d; smart card chips 234a, 234b, 234c, and 234d. Smart card 230 defines: (i) four directions A, B, C and D; and (ii) dimensions D1, D2 and D3.

As shown in FIG. 3, the card body can be slid into a standard card reader in one of four directions: A, B, C or D. Four chips are mounted on a single major surface of the card. The chips are mounted on the card according to conventional techniques, such as card lamination. Sliding the card body in the appropriate direction will read the corresponding smart chip. For instance, sliding the card body in the A direction the card reader will read chip 234a; sliding in the B direction the card reader will read chip 234b; and so on.

Card body 230 shows that the card body is square in shape, which facilitates the use of four chips, each with its own dedicated insertion direction A, B, C, D. Each chip is surrounded by: (i) two parallel, opposing edges (the "lateral edges") that extend in the insertion direction for that chip; and (ii) one "leading edge" that is perpendicular to the insertion direction (and to the parallel edges of item (i) in this list).

As mentioned above, precise placement of the chip relative to leading edge and the lateral edges can ensure that a standard reciprocating card reader will make an appropriate data communication connection with each chip in a multiple chip card. For example, assembly 230 is sized and/or shaped so that: (i) card body sides being dimensioned as length D1, which allows the card body to snuggly fit into the card reader 100 (see D1 on FIG. 1) in 4 different directions A, B, C, D without sideways wobble; (ii) repeated dimension D3 is controlled so that each chip is correctly located with respect to its insertion direction; and (iii) repeated dimension D2 is controlled so that each chip is correctly located with respect to the direction perpendicular to its insertion direction. To further illustrate the card body/card reader seating, the first inserted card edge will rest against card reader bottom wall 116 (FIG. 1), thus preventing any further insertion. The card edges parallel to the chip edges of interest are guided along card reader side walls 114 and 118, thus preventing any substantial lateral card motion. This potential lateral card motion, which is prevented by the four sets of parallel edges spaced apart by dimension D1, is sometimes referred to as "wobble."

Preferred values for dimensions D1, D2 and D3, under current reciprocating smart card reader standards are as follows: (i) D1=53.89 millimeters (mm); (ii) D2=24.98 mm; and (iii) D3=8.9 mm. The preferred card thickness is 1 mm.

Figure 4A:
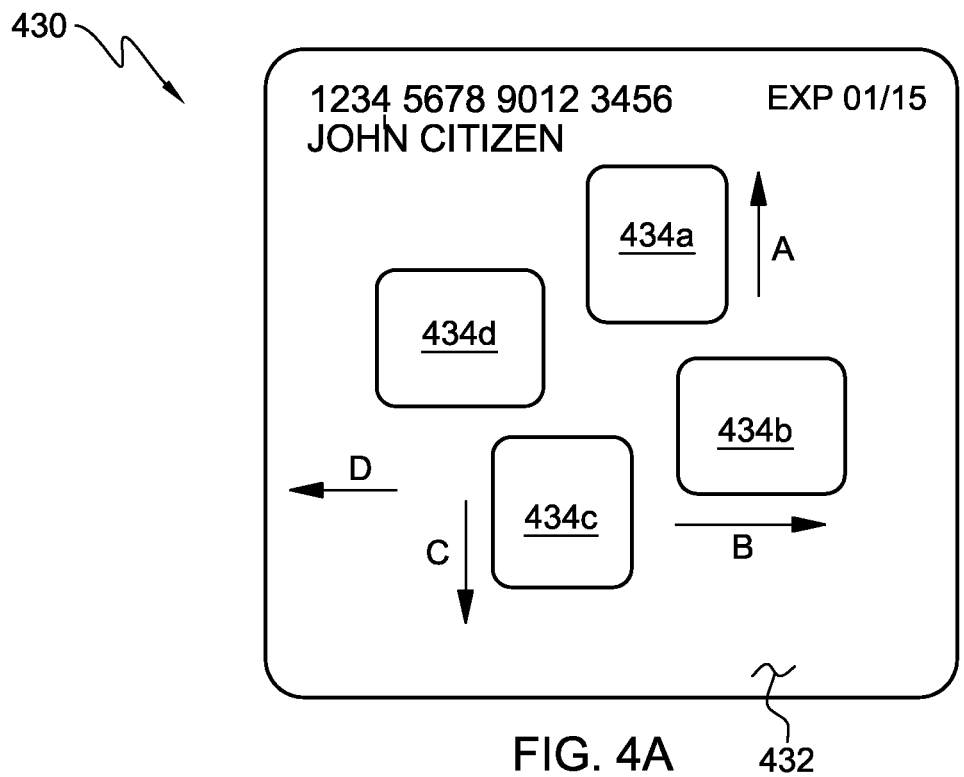
FIG. 4A is an orthographical front view of a third embodiment of a smart card according to the present invention.
Figure 4B:
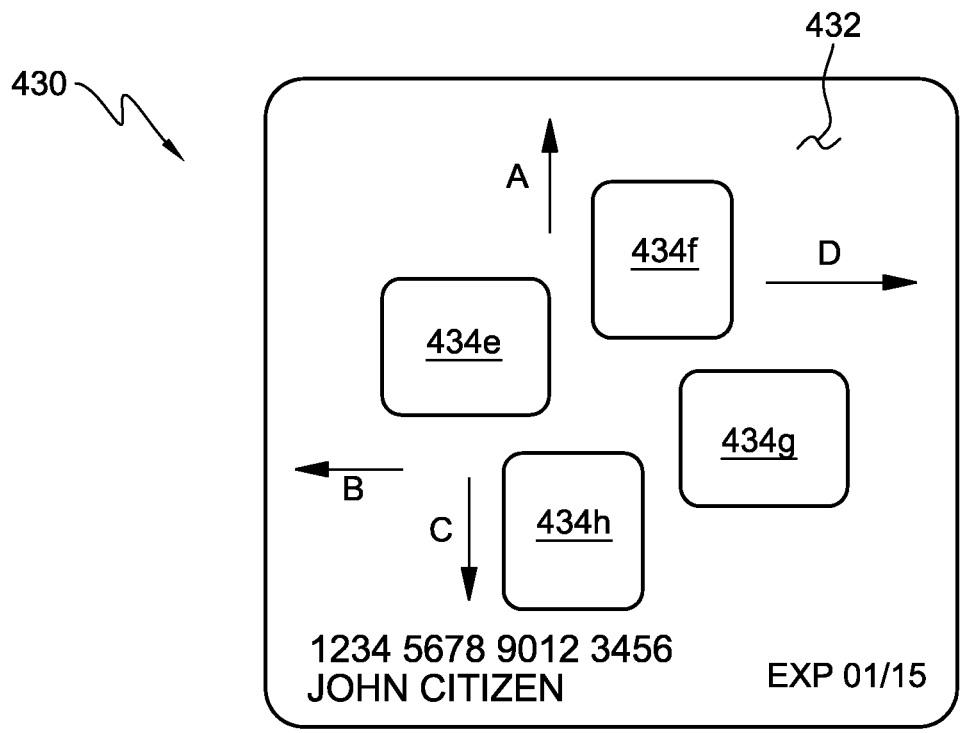
FIG. 4B is an orthographic rear view of a third embodiment smart card.

As shown in FIGS. 4A and 4B, smart card assembly 430 includes: card body 432; and eight smart card chips 434a, b, c, d, e, f, g, h. By comparing the views of FIGS. 4A and 4B, it is apparent that the footprints of the chips, on opposite major surfaces of the card body, will overlap. It should be understood that the card must be thick enough and the chips must be thin enough to accommodate this overlap without mutual physical interference between opposite surface chips in the thickness direction. Not all currently existing smart card designs can accommodate this sort of overlap. However: (i) the chips themselves could be offset appropriately and only the contacts be positioned in the appropriate location for the reader to make contact; (ii) the technology of the chips will continue to evolve and reduce in physical dimensions, thereby allowing chips to exist in such proximity; (iii) it is also possible that a single, double sided, chip could be utilized with a sensor or switch to ensure the presented side was the active chip in terms of data transfer; and/or (iv) the foregoing approaches can be combined so that the physical chip itself multiplies the contacts but only one side is active at any given time since activation is established by contact with the reader.

As shown in FIGS. 4A and 4B, the total number of smart chips on card body 432 is eight. This is accomplished by respectively mounting four chips to each major surface of the card body. With currently standard reciprocating card readers, only one chip will be in data communication with the reader when the card is fully inserted into the reader's recess, but, in the future, readers may: (i) read more than one chip at a time; and/or (ii) read chip(s) from both major surfaces at the same time. When assembly 430 is used with a currently-standard reciprocating card reader, then there are eight possible insertion orientations as follows: (i) four insertion directions A, B, C, D with the major surface shown in FIG. 4A facing the reader head (not shown); and (ii) four insertion directions A, B, C, D with the major surface shown in FIG. 4B facing the reader head (not shown).

Some additional comments about the present invention will be made in the following paragraphs.

At least some embodiments of the present invention may have at least some of the following benefits:

(i) Fewer smart cards to carry and/or manage;

(ii) Positive impact on the environment;

(iii) Cost effective way of providing access to many applications (car park, apartment lobby, etc.) without unduly increasing the number of smart cards a user must carry;

(iv) Invention may be applied to smart cards with or without magnetic strips (as long as the chips do not overlap with the footprint of any magnetic strip);

(v) May decrease smart card-related waste;

(vi) Encourages additional smart card use by various institutions, because each institution is not required to provide a dedicated smart card (but, rather, just data for one of the available chips);

(vii) May help prevent and/decrease theft, loss and/or fraudulent activities; and/or (viii) Due to logistics and cost issues, some organizations will not have critical mass, so by standardizing on a single chip set, it may be easier and cheaper for those institutions to issue a smart chip or program designated chip on the Multi Chip Smart Card.

Some possible features of some possible embodiments of the present invention will now be identified: (i) each chip on the card may have a unique identifier; (ii) ability to issue a single card, each chip on the card is designated to a different identity; (iii) ability to issue a single card, each chip on the card is designated to a different institution (such as car park, strata body, government office, financial institution, etc.); (iv) using a square Multi Chip Smart card instead of the currently-popular rectangle one; (v) bringing together multiple plastic cards to a single card; (vi) a smart card with multiple chips, where every chip can be read by an ISO CR-80 and/or 7810 compliant card reader; (vii) no changes to existing card readers required; (viii) use existing Smart Card Programming Devices to program new Multi Chip Smart Card; (ix) each chip on the card may have a unique identifier tied to an institution or an identity issuer; (x) multiple chip smart card suitable for use with Near Field Communication (NFC) technology (as NFC technology exists now and/or is likely to evolve in the future); (xi) multiple chip smart card suitable for Touch & Go transactions; (xii) reduce the need to issue of many access cards by different institutions, but institution will have control over the contents of the smart chip on the physical card; (xiii) duplicating and/or reproducing stolen cards will generally be relatively difficult; (xiv) saving of plastic by 0.16 square meters for combining 4 cards and 0.34 square meters for combining 8 cards.

The following paragraphs provide definitions for certain term(s) used in this document:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

Standard reciprocating card reader/standard card reader: Any card reader design and/or specification that is widely used now, or widely used in the future; a "standard" card reader is not limited with respect to: (i) particular dimensions for the card recess, card, and/or chip placement, (ii) number of reading heads, and (iii) number of smart card major surfaces that oppose reading heads.

What is claimed is:

1. A smart card assembly for use with a reciprocating card reader, the assembly comprising:
a card body;
a first chip; and
a second chip;
wherein:
the card body includes a first major surface;
the first and second chips are mounted on the first major surface at a location and in an orientation so that an insertion direction for reading the first chip by the reciprocating card reader is at least substantially perpendicular to an insertion direction for reading the second chip by the reciprocating card reader; and
the orientation of the first chip, that is defined by the insertion direction for reading the first chip, is perpendicular to the orientation of the second chip that is defined by the insertion direction for reading the second chip.

2. The assembly of claim 1 wherein:
the shape of the card body and the location and orientation of the first chip define a first leading edge of the card body;
the shape of the card body and the location and orientation of the first chip define a second leading edge of the card body; and
a distance between the first chip and the first leading edge is substantially equal to a distance between the second chip and the second leading edge.

3. The assembly of claim 2 wherein:
the shape of the card body and the location and orientation of the first chip define a first set of parallel lateral edges of the card body;
the shape of the card body and the location and orientation of the first chip define a second set of parallel lateral edges of the card body; and
distances between the first chip and its respective lateral edges is substantially equal to distances between the second chip and its respective lateral edges.

4. The assembly of claim 3 wherein:
the first leading edge is the same as one edge of the second set of lateral edges; and
the second leading edge is the same as one edge of the first set of lateral edges.

5. The assembly of claim 2 wherein the first leading edge is at least substantially perpendicular to the second leading edge.

6. The assembly of claim 5 wherein the first leading edge and second leading edge intersect in proximity to a first corner of the card body.

7. A smart card assembly for use with a reciprocating card reader, the assembly comprising:
a card body;
a first chip;
a second chip;
a third chip; and
a fourth chip;
wherein:
the card body includes a first major surface;
the first, second, third and fourth chips are mounted on the first major surface at a location and in an orientation so that:
an insertion direction for reading the first chip by the reciprocating card reader is at least substantially perpendicular to an insertion direction for reading the second chip by the reciprocating card reader,
an insertion direction for reading the third chip by the reciprocating card reader is at least substantially perpendicular to an insertion direction for reading the fourth chip by the reciprocating card reader, and
the insertion direction for reading the first chip by the reciprocating card reader is at least substantially opposite the insertion direction for reading the third chip by the reciprocating card reader.

8. The assembly of claim 7 wherein the card body is at least substantially square in shape.

9. A smart card assembly for use with a reciprocating card reader, the assembly comprising:
a card body;

a first primary-side chip;
a first secondary-side chip;
a second primary-side chip; and
a second secondary-side chip;
wherein:
the card body includes a first major surface, and a second major surface;
the first primary-side chip is mounted on the first major surface of the card body;
the first secondary-side chip is mounted on the second major surface of the card body;
the second primary-side chip is mounted on the first major surface of the card body;
the second secondary-side chip is mounted on the second major surface of the card body;
the first and second primary-side chips are mounted on the first major surface at a location and in an orientation so that an insertion direction for reading the first primary-side chip by the reciprocating card reader is at least substantially perpendicular to an insertion direction for reading the second primary-side chip by the reciprocating card reader; and
the first and second secondary-side chips are mounted on the first major surface at a location and in an orientation so that an insertion direction for reading the first secondary-side chip by the reciprocating card reader is at least substantially perpendicular to an insertion direction for reading the second secondary-side chip by the reciprocating card reader.

10. The assembly of claim 9 further comprising:
a third primary-side chip;
a fourth primary-side chip;
a third secondary-side chip; and
a fourth secondary-side chip;
wherein:
the first, third and fourth primary-side chips are mounted on the first major surface at a location and in an orientation so that:
an insertion direction for reading the third primary-side chip by the reciprocating card reader is at least substantially perpendicular to an insertion direction for reading the fourth primary-side chip by the reciprocating card reader, and
the insertion direction for reading the first primary-side chip by the reciprocating card reader is at least substantially opposite the insertion direction for reading the third primary-side chip by the reciprocating card reader; and
the first, third and fourth secondary-side chips are mounted on the second major surface at a location and in an orientation so that:
an insertion direction for reading the third secondary-side chip by the reciprocating card reader is at least substantially perpendicular to an insertion direction for reading the fourth secondary-side chip by the reciprocating card reader, and
the insertion direction for reading the first secondary-side chip by the reciprocating card reader is at least substantially opposite the insertion direction for reading the third secondary-side chip by the reciprocating card reader.

11. The assembly of claim 10 wherein the card body is at least substantially square in shape.

\* \* \* \* \*